March 5, 1946.   A. J. SCAIFE   2,395,909
STACK RELEASING DEVICE FOR MOTOR VEHICLES
Filed July 12, 1944   2 Sheets-Sheet 1
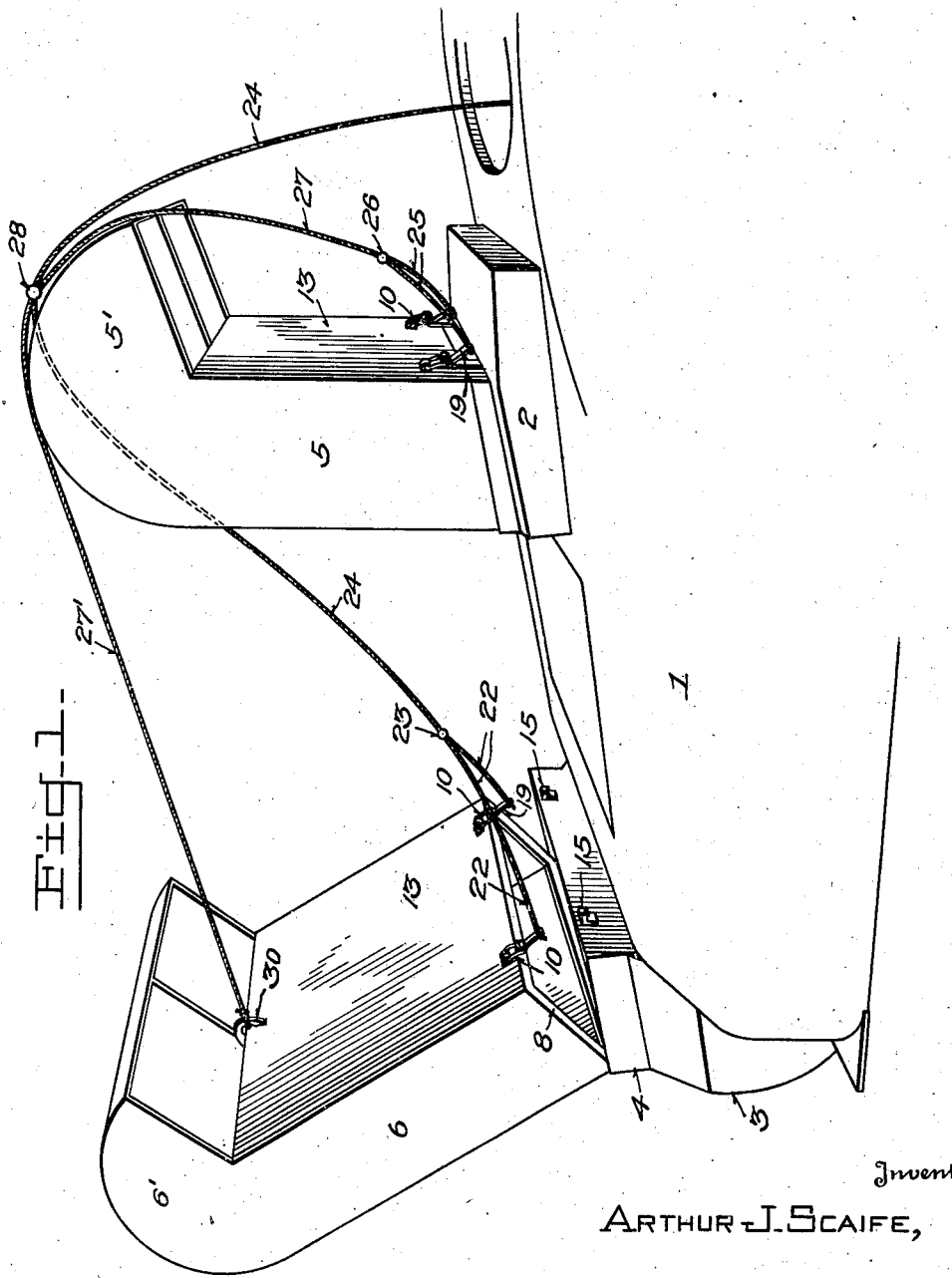
Inventor
ARTHUR J. SCAIFE, March 5, 1946. A. J. SCAIFE 2,395,909
STACK RELEASING DEVICE FOR MOTOR VEHICLES
Filed July 12, 1944 2 Sheets-Sheet 2
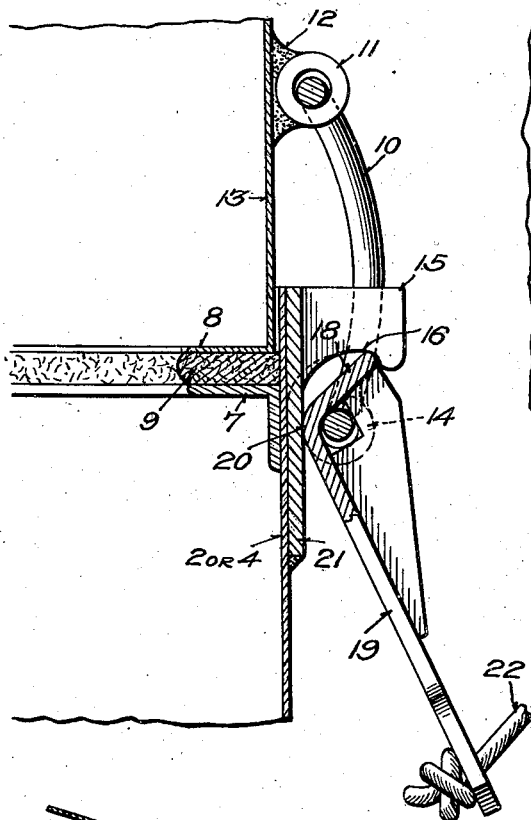
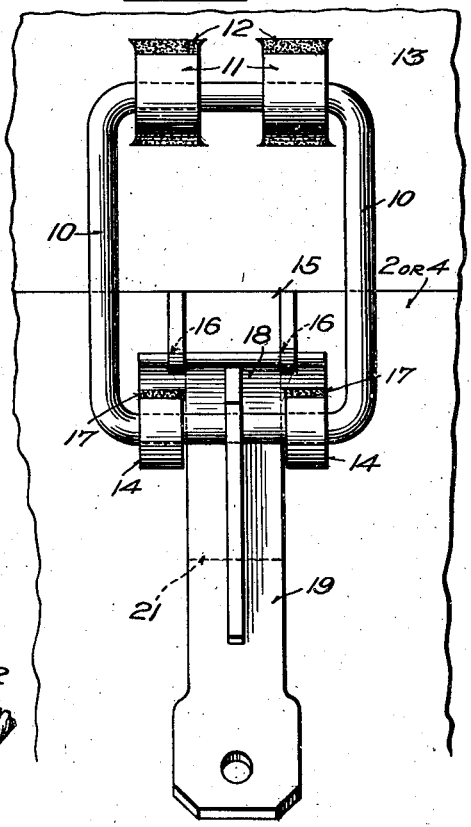
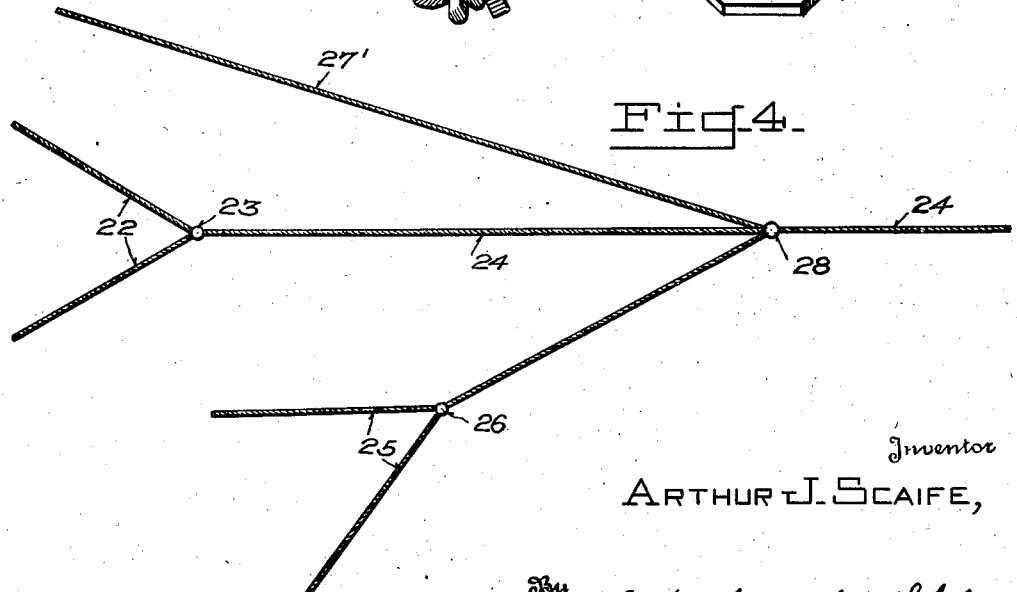
Inventor
ARTHUR J. SCAIFE, Patented Mar. 5, 1946

2,395,909

UNITED STATES PATENT OFFICE 2,395,909

STACK RELEASING DEVICE FOR MOTOR VEHICLES

Arthur J. Scaife, Detroit, Mich.

Application July 12, 1944, Serial No. 544,621

10 Claims. (Cl. 180—1)

(Granted under the act of March 3, 1883, as amended April 30, 1928; 370 O. G. 757)

The invention described herein may be manufactured and used by or for the Government for governmental purposes, without the payment to me of any royalty thereon.

Military operations in the current war call for the travel of motor driven land vehicles in a submerged or nearly submerged condition. An example of such operation is the landing of combat tanks from ships off enemy shores, where the ships cannot lie close to the shore. The tanks, equipped according to this invention, are merely run off the ships into the water, where they sink to the bottom and are driven along the bottom to the shore.

In addition to sealing the tanks, there is the problem of admitting air for the engine and for ventilation and the release of the exhaust gas. The invention provides vertical stacks over the air intake and the exhaust outlet, the stacks being of such height as to extend above the surface of the water. When the tanks reach the shore, the stacks are to be jettisoned; and the invention is particularly concerned with a means for quickly performing the latter operation.

The stacks are secured over their respective openings by means of latches. One stack is positioned considerably forward of the other, and it is desirable to release the stacks one at a time rather than simultaneously. A cable extends from the forward latches of the rear stack to an operating point within the vehicle. Another cable extends from the forward latches of the forward stack to the first cable, and a third cable may be provided between an upper point on the rear stack to the latch cable for the forward stack. The system of cables is such that when the operating cable is pulled, the rear stack is released first and, in falling, releases the latches of the forward stack.

The invention also includes a resilient means between each stack and its supporting frame arranged to be compressed on tightening the latches. Thus, on release of the latches in the manner described, the forward edge of each stack is thrown upward by the resilient means and started on its fall. The resilient means is preferably in the nature of a felt gasket which also serves as the seal between the stack and its supporting frame.

An illustrative embodiment of the invention is disclosed in the following description and in the accompanying drawings in which:

Figure 1 is a perspective view of a portion of a vehicle having an embodiment of the present invention attached thereto;

Figure 2 is a vertical sectional view illustrating the latch used to attach the stacks to the vehicle;

Figure 3 is an elevational view of the structure shown in Figure 2, and

Figure 4 is a semi-diagrammatic plan view of the cable system.

In Figure 1 is shown the rear upper portion of a heavy motor vehicle 1 such as a combat tank having intermediate its ends a flanged air inlet opening 2 and, at its rear end, an exhaust duct 3 terminating in a flanged outlet 4. The openings defined by the flanges 2 and 4 face upwardly. The major portion of the air admitted at the flanged opening 2 is taken into the engine, and another portion is used for ventilation of the crew compartment within the vehicle. The exhaust from the engine occurs at the rear end of the vehicle, and the normal exhaust outlet to atmosphere is through the duct 3.

In order that the vehicle may travel in a substantially submerged condition, stacks 5 and 6 are mounted respectively over the flanged openings 2 and 4 by means that will presently be described. Each stack has a hooded upper end 5', 6' facing forwardly and somewhat downwardly to reduce the direct admission of exhaust gas from the stack 6 into the intake stack 5.

Each stack is secured upon its flange by a set of four latches, two at the forward side and two at the rearward side. Inasmuch as the latches are identical, it will be necessary to describe only one of them in detail.

Around the inner surface of the flange 2 or 4 is secured an angle iron 7 constituting a support for an inward flange 8 on the lower edge of the stack. Upon the angle iron 7 is secured a felt gasket 9 functioning as a seal and also as a resilient separating device as will presently be described.

Each latch includes a loop or buckle 10 of quadrilateral form and slightly bowed as shown in Figures 2 and 3. The upper end of the buckle carries a pair of spools 11 welded at 12 to the forward or rear wall of the stack, as the case may be, this wall being designated by the numeral 13. The lower end of the buckle also has rotatably mounted thereon a similar pair of spools 14 for a purpose that will presently be described.

On the flange 2 or 4, directly below the weld 12, is secured an angular catch 15 having a downwardly facing cam edge 16. The lower spools 14 are welded at 17 into the vertex of a releasing lever consisting of a short arm 18 engaging the cam edge and a downwardly extending longer arm 19. The outer vertex 20 of the lever bears against the vertical leg 21 of the catch 15. When the leg 19 at the forward side of a stack is pulled forwardly, by means presently to be described, the lever fulcrums first on its vertex 20 and later on the free end of the shorter arm 18, so that the lower end of the buckle is drawn out from under the catch 15.

The forward levers 19 of the rear stack have cords 22 tied thereto and to each other at 23 to form a V-shaped figure. From the point 23 a single cable 24 is thrown over the forward stack 5 and into the interior or the crew compartment of the vehicle. Similar cords 25 are attached to the forward levers 19 of the forward stack and joined together at 26 to form a V-shaped figure. From the point 26, a cable 27 is extended to the cable 24 and tied thereto at 28. The cable 27 is continued at 27' to the rear stack 6 where it is attached to a loop 30 at an upper point thereof.

The purpose of the latch and cable system is to release the stacks for jettisoning when the vehicle emerges from the water. The operator pulls the cable 24, thereby releasing the forward latches on the rear stack without affecting the tied latches on the forward stack. The cable 27' tied to the rear stack 6 limits the inward pull on the initial operating cable 24 so that the latches tied to the cords 25 are not released by the same pull. The gasket 9, having been compressed from about one inch to about one-half inch, furnishes sufficient pressure on release to throw the forward edge of the rear stack upward and start it swinging rearward on its rear edge. The cables are initially nearly taut, and the release of the latches by the cords 22 introduces a small amount of slack that permits the point 28 to move rearward some distance before pulling on the cord 25. The latches attached to these cords are thus released only after the rear stack 6 has fallen backward a short distance. On release of these latches, the stack 5 is thrown backward by the gasket formerly compressed thereby, in the manner already described. The inertia of the stacks while the vehicle is in motion is sufficient to displace the center of gravity in each stack rearward of its base so that the fall of each stack is completed. It will be evident by examination of Figure 1 that the rear latches are released by the rearward swing of the stacks.

Although the felt gaskets serve the dual purpose of seals and springs, it is nevertheless within the scope of the invention to provide an independent means for each function, such as gaskets for sealing and springs for the initial rearward impetus.

While a specific embodiment of the invention has been shown and been described, it will be understood that various alterations may be made without departure from the spirit of the invention as indicated by the appended claims.

What I claim is:

1. The combination with a substantially enclosed submersible vehicle having spaced openings communicating with the interior thereof and providing an inlet for the admission of fresh air and an outlet for the exhaust of gaseous media therefrom, stack supporting frames disposed about each of said openings, a stack mounted on each frame, a latch on the forward wall of each stack for attaching the stacks to the frames, a cable extending from said latch on the rear stack to an operating point, another cable extending from an upper point of the rear stack to the first cable, and a third cable extending from the second cable to said latch on the forward stack.

2. The combination with a substantially enclosed submersible vehicle having spaced openings communicating with the interior thereof and providing an inlet for the admission of fresh air and an outlet for the exhaust of gaseous media therefrom, stack supporting frames disposed about each of said openings, a stack mounted on each frame, a latch on the forward wall of each stack for attaching the stacks to the frames, each latch including an operating lever, a cable extending from the lever on the rear stack to an operating point, another cable extending from an upper point of the rear stack to the first cable, and a third cable extending from the second cable to the lever on the forward stack.

3. The combination with a substantially enclosed submersible vehicle having spaced openings communicating with the interior thereof and providing an inlet for the admission of fresh air and an outlet for the exhaust of gaseous media therefrom, stack supporting frames disposed about each of said openings, a stack mounted on each frame, a latch on the forward wall of each stack for attaching the stacks to the frames, a cable extending from said latch on the rear stack to an operating point, another cable extending from an upper point of the rear stack to the first cable, and a third cable extending from the second cable to said latch on the forward stack, and resilient means between each stack and its frame and adapted to be compressed thereby on closing said latches.

4. The combination with a substantially enclosed submersible vehicle having spaced openings communicating with the interior thereof and providing an inlet for the admission of fresh air and an outlet for the exhaust of gaseous media therefrom, stack supporting frames disposed about each of said openings, a stack mounted on each frame, a latch on the forward wall of each stack for attaching the stacks to the frames, a cable extending from said latch on the rear stack to an operating point, another cable extending from an upper point of the rear stack to the first cable, and a third cable extending from the second cable to said latch on the forward stack, and a resilient gasket between each stack and its frame and adapted to be compressed thereby on closing said latches.

5. The combination with a substantially enclosed submersible vehicle having spaced openings communicating with the interior thereof and providing an inlet for the admission of fresh air and an outlet for the exhaust of gaseous media therefrom, stack supporting frames disposed about each of said openings, a stack mounted on each frame, a latch on the forward wall of each stack for attaching the stacks to the frames, a cable extending from said latch on the rear stack over the forward stack to an operating point, another cable extending from an upper point of the rear stack to the first cable, and a third cable extending from the second cable to said latch on the forward stack.

6. The combination with a substantially enclosed submersible vehicle having spaced openings communicating with the interior thereof and providing an inlet for the admission of fresh air and an outlet for the exhaust of gaseous media therefrom, stack supporting frames disposed about each of said openings, a stack mounted on each frame, a latch on the forward wall of each stack for attaching the stacks to the frames, each latch including an operating lever, a cable extending from the lever on the rear stack to an operating point, another cable extending from an upper point of the rear stack to the first cable, and a third cable extending from the second cable to the lever on the forward stack, and resilient means between each stack and its frame and adapted to be compressed thereby on closing said latches.

7. The combination with a substantially enclosed submersible vehicle having spaced openings communicating with the interior thereof and providing an inlet for the admission of fresh air and an outlet for the exhaust of gaseous media therefrom, stack supporting frames disposed about each of said openings, a stack mounted on each frame, a latch on the forward wall of each stack for attaching the stacks to the frames, a cable extending from said latch on the rear stack over the forward stack to an operating point, another cable extending from an upper point of the rear stack to the first cable, and a third cable extending from the second cable to said latch on the forward stack, and resilient means between each stack and its frame and adapted to be compressed thereby on closing said latches.

8. The combination with a substantially enclosed submersible vehicle having spaced openings communicating with the interior thereof and providing an inlet for the admission of fresh air and an outlet for the exhaust of gaseous media therefrom, stack supporting frames disposed about each of said openings, a stack mounted on each frame, a latch on the forward wall of each stack for attaching the stacks to the frames, a cable extending from said latch on the rear stack to an operating point, and another cable extending from the first cable to said latch on the forward stack.

9. The combination with a substantially enclosed submersible vehicle having spaced openings communicating with the interior thereof and providing an inlet for the admission of fresh air and an outlet for the exhaust of gaseous media therefrom, stack supporting frames disposed about each of said openings, a stack mounted on each frame, a latch on the forward wall of each stack for attaching the stacks to the frames, a cable extending from said latch on the rear stack to an operating point, and another cable extending from the first cable to said latch on the forward stack, and resilient means between each stack and its frame and adapted to be compressed thereby on closing said latches.

10. The combination with a substantially enclosed submersible vehicle having spaced openings communicating with the interior thereof and providing an inlet for the admission of fresh air and an outlet for the exhaust of gaseous media therefrom, stack supporting frames disposed about each of said openings, a stack mounted on each frame, latches on the forward and rear walls of each stack for attaching the stacks to the frames, a cable extending from the forward latch of the rear stack to an operating point, another cable extending from an upper point of the rear stack to the first cable, and a third cable extending from the second cable to the forward latch of the forward stack.

ARTHUR J. SCAIFE.